Patented Dec. 14, 1943

2,336,826

UNITED STATES PATENT OFFICE 2,336,826

PYRIMIDINE COMPOUNDS

Robert R. Williams, Summit, N. J., and Joseph K. Cline, Galveston, Tex., assignors to Research Corporation, New York, N. Y., a corporation of New York No Drawing. Original application December 24, 1937, Serial No. 181,710, which is a division of application Serial No. 134,334, April 1, 1937. Divided and this application July 9, 1942, Serial No. 450,295

3 Claims. (Cl. 260—251)

This invention relates to pyrimidine compounds useful for the production of antineuritic compounds and, particularly, to the synthesis of pyrimidine compounds and various other intermediates which are useful for the production of vitamin $B_1$, salts thereof, and related products having the essential physiological properties of vitamin $B_1$. This application is a division of our copending application Serial No. 181,710, filed December 24, 1937, as a division of our copending application Serial No. 134,334, filed April 1, 1937.

The present invention relates to methods by which vitamin $B_1$ and kindred compounds may be synthesized. These syntheses make available vital substances which may be incorporated in pharmaceutical products and in foods deficient in vitamin $B_1$. These syntheses make available to the public vital substances in concentrated form which may be employed as preventatives against or remedies for various disorders, e. g., beriberi, stomatitis with colitis, metabolic polyneuritis of pregnancy, gastrointestinal atony and alcoholic neuritis. These materials are also useful for incorporation in foods deficient in vitamin $B_1$ and in pharmaceutical products.

The object of the invention is to provide pyrimidine compounds useful in the synthesis of vitamin $B_1$ and its salts.

Vitamin $B_1$ is obtained from natural sources in the form of its acid salts, usually as the chloride hydrochloride. These salts have the following general structure:

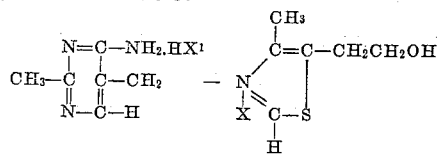

in which X is an anion and $HX^1$ is an acid, the anion portion of which may or may not be the same as the one represented by X.

The syntheses embodying this invention comprise the coupling of two distinct radicals or groups to form the vitamin or other closely allied substances. One of these groups is a derivative of pyrimidine having the constitution indicated by the following formula:

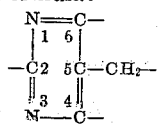

This has been termed the pyrimethyl group and the atoms of the pyrimidine ring portion thereof have been numbered as shown in the structural formula given hereinabove to designate the positions of any attached groups or elements. It will be observed that in vitamin $B_1$, the methyl group and the amino group are attached to the pyrimethyl group in the 2 and 6 positions, respectively, and that hydrogen is in the 4 position.

The other radical entering into the coupling reaction is a substituted thiazole nucleus, the nucleus having the structure indicated by the following formula:

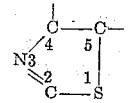

From an examination of the formula given hereinabove for the acid salts of vitamin $B_1$, it is evident that the thiazole nucleus contained in the natural vitamin has attached thereto a hydrogen atom in the 2 position, a methyl group in the 4 position and a $\beta$-hydroxy-ethyl group in the 5 position. The basic compound having these attached groups is described in Patent No. 2,134,015 granted October 25, 1938, to R. R. Williams for Thiazole compounds. Acids add directly to this thiazole to form salts thereof and these salts may be used in the syntheses instead of the base, if desired.

The present invention pertains to the production of pyrimethyl esters and acid salts thereof which are especially suitable for the preparation of antineuritic substances. It has been found that effective results may be obtained by first producing a mixed ether such, for example, as 2-methyl-6-amino-pyrimethyl-ethyl ether or 2-methyl-6-amino-pyrimethyl-methyl-ether and to obtain acid esters therefrom having the formula:

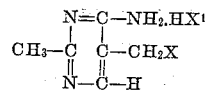

in which X is an acid radical in non-ionic combination and $HX^1$ is an acid, the anion portion of which may or may not be the same as the acid radical or element represented by X.

Among the pyrimethyl esters which may be employed in practicing the invention, the halide esters and acid salts thereof, particularly the halogen acid salts, are especially effective. To illustrate the invention, specific examples will be given of particular pyrimethyl halide esters and acid salts thereof embodying the invention.

Such compounds may be made in accordance with the processes described in detail in the aforesaid application Serial No. 181,710, of which this application is a division. These processes involve a series of preliminary steps by which there is prepared a compound having the general formula:

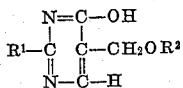

wherein $R^1$ and $R^2$ are respectively alkyl or aralkyl radicals (methyl, ethyl, propyl, benzyl, etc.). By replacing the 6-oxy radical of this compound with a 6-amino radical and the $-OR^2$ group with an acid radical, e. g. bromine, a compound is produced which is capable of coupling with a thiazole nucleus as above set forth.

One compound falling within the general formula outlined above and which is of particular importance is the one designated 2-methyl-6-oxy-pyrimethyl-ethyl ether. A description of the process for making 2-methyl-6-oxy-pyrimethyl-ethyl ether will first be given and this will be followed by specific examples of processes embodying the invention in which various pyrimethyl esters embodying the invention are obtained from this compound.

*Example I*

A suitable pyrimethyl ester for use in the coupling reaction is 2-methyl-6-amino-pyrimethyl-bromide and one process for making this bromide ester comprises a series of steps including those set forth in the aforementioned copending applications which are substantially as follows:

1. β-Ethoxy-propionic-ethyl ester
2. Sodio-formyl-β-ethoxy-propionic-ethyl ester
3. 2-methyl-6-oxy-pyrimethyl-ethyl ether
4. 2-methyl-6-chlor-pyrimethyl-ethyl ether
5. 2-methyl-6-amino-pyrimethyl-ethyl ether
6. 2-methyl-6-amino-pyrimethyl-bromide The sequence and significance of these steps may be made more apparent by writing the structural formulae of the compounds as follows:

1. 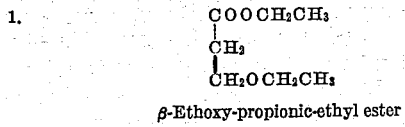
β-Ethoxy-propionic-ethyl ester

2. 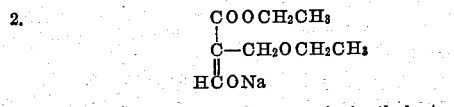
Sodio-formyl-β-ethoxy-propionic-ethyl ester

3. 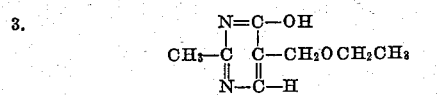
2-methyl-6-oxy-pyrimethyl-ethyl ether

4. 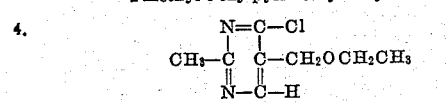
2-methyl-6-chlor-pyrimethyl-ethyl ether

5. 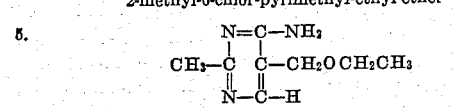
2-methyl-6-amino-pyrimethyl-ethyl ether

6. 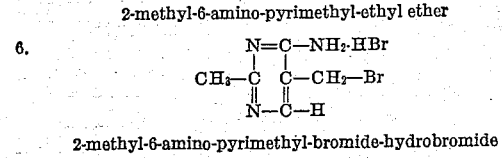
2-methyl-6-amino-pyrimethyl-bromide-hydrobromide

The steps in the following detailed disclosure correspond to the numbers in the above schedule.

*Step 1.*—A mixture of 116 gms. of sulphuric acid (sp. g. 1.84), 18 gms. of water, 200 cc. absolute alcohol, and 99 gms. of β-ethoxy-propionitrile is heated, under refluxing, for about six hours. At the end of this time, the mixture is cooled and allowed to stand until all the ammonium bisulphate produced has crystallized out. The ammonium bisulphate is filtered off, washed several times with absolute alcohol, and the combined filtrate and washings are distilled to remove the major portion of alcohol. Ice water is added to the residue, the excess acid neutralized, and the solution finally made slightly basic by the addition of sodium carbonate. The mixture is then extracted with ether, the ethereal solution dried over sodium sulphate, and the solution fractionated by distillation. β-ethoxy-propionic-ethyl ester is obtained in the form of a pleasant smelling, water-white liquid having a boiling point of about 70–72° at 24 mm. pressure. In this reaction compounds having alkyl radicals (and aralkyl radicals) other than the ethyl radical can be substituted.

*Step 2.*—A mixture of 75 gms. of β-ethoxy-propionic-ethyl ester and about 40 gms. of ethyl formate slowly dropped onto 12 gms. of sodium wire covered with anhydrous ether. Hydrogen is evolved, and a yellow salt precipitates out of the ether. If the reactions proceeds slowly, without causing ebullition of the ether the amount of sodium specified is sufficient. However, if the reaction proceeds violently, increasing amounts of sodium up to a total of two equivalents may be necessary. For best results, the time for addition of the ester is about eight hours. The thus formed sodio-formyl derivative is used without isolation in the succeeding reaction. It must be protected from atmospheric moisture and should be used promptly, as it is not very stable.

Instead of the above described derivative, compounds having the general formula:

wherein R and $R^1$ are alkyl or aralkyl radicals and M is an alkali metal, may be produced from appropriate reagents, if desired, by a similar method and used in the succeeding step.

*Step 3.*—To the ether suspension of the sodio-formyl derivative obtained in Step 2, 45 gms. of acetamidine hydrochloride, 100 cc. of absolute alcohol, and a solution of 12 gms. of sodium in 200 cc. of absolute alcohol are added. The ether is distilled off, and the mixture heated, under refluxing, for about sixteen hours. The contents of the flask are then cooled, neutralized with 10% acetic acid, and evaporated down on a steam bath. The residue is taken up in a small amount of water and extracted repeatedly with chloroform. The combined chloroform extracts are dried with sodium sulphate and the chloroform removed by evaporation. The remaining brown, gummy substance is treated with dioxane, after which a portion dissolves and a considerable quantity of the gum is solidified. The solid is dried and sublimed in high vacuo at 140° C. The sublimate is placed in a Soxhlet extractor and extracted repeatedly with anhydrous ether. The residue is dried and again sublimed in high vacuo, yielding substantially pure 2-methyl-6-oxy-pyrimethyl-ethyl ether having a melting point of about 175° to 176° C.

Instead of proceeding as above set forth the following preferred method of carrying out Step 3 may be employed:

To the reaction mixture obtained in Step 2, add carefully a mixture of 100 to 200 gms. of crushed ice and water, just sufficient to produce solution of the material. The ether separates and is removed. There is then added 45 gms. of acetamidine hydrochloride followed by 10 gms. of NaOH (in the form of a 30% NaOH solution). The mixture is allowed to stand 3 to 4 days, after which it is neutralized with strong hydrochloric acid and is then extracted repeatedly with chloroform. The chloroform solution is evaporated to dryness and the crude product, 2-methyl-6-oxy-pyrimethyl-ethyl-ether, is dried to constant weight. For purification it can be crystallized from amyl ether.

Instead of the specific compound produced as above described, compounds having the general formula:

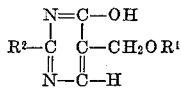

may be produced, where $R^1$ and $R^2$ are alkyl or aralkyl groups, by condensing compounds having the general formula indicated at the end of Step 2 with homologues of acetamidine, e. g. propamidine, butamidine, etc.

*Step 4.*—One gm. of 2-methyl-6-oxy-pyrimethyl-ethyl ether is heated with 8 cc. of phosphorous oxychloride for about three hours at 78° C. The phosphorous oxychloride is then removed in vacuo. The residue is poured onto ice and excess acid is neutralized by the addition of sodium bicarbonate or ammonia and the mixture extracted repeatedly with chloroform. The combined chloroform extracts are dried over sodium sulphate and the chloroform removed in vacuo. Approximately 1 gm. of an oily residue remains consisting largely of 2-methyl-6-chlor-pyrimethyl-ethyl ether.

By employing compounds having the general formula

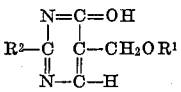

where $R^1$ and $R^2$ are alkyl or aralkyl radicals, compounds having the general formula

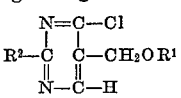

are obtained.

Instead of the 6-chlor pyrimethyl compounds just described, the corresponding 6-brom and 6-iodo compounds, which may be made in an analogous manner, may also be used if desired.

*Step 5.*—The product of Step 4 is treated with about 5 to 15 cc. of alcoholic ammonia in a bomb tube at about 140° C. for a period of time sufficient to convert all bromine into ionic form e. g. three hours. The contents of the tube are then evaporated down leaving a partly crystalline residue. This residue is dissolved in water, sodium bicarbonate or carbonate is added and the solution extracted repeatedly with chloroform. The combined chloroform extracts are dried over sodium sulphate and the chloroform removed in vacuo, leaving an oily residue which crystallizes on standing and cooling. The crude product may be recrystallized from ether or ligroin, and pure 2-methyl-6-amino-pyrimethyl-ethyl ether, having a melting point of 89.5 to 90.5° C. is obtained. If desired, the crude product may be purified by repeatedly subliming it in high vacuo at 60° to 80° C.

By employing compounds having the general formula

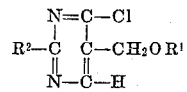

compounds having the formula

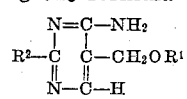

may be obtained, when $R^1$ and $R^2$ are alkyl or aralkyl radicals.

*Step 6.*—The 2-methyl-6-amino-pyrimethyl-ethyl ether produced in accordance with the process outlined in Step 5 may be treated in various ways to produce a hydrobromide of 2-methyl-6-amino-pyrimethyl bromide hydrobromide. In one process 50 mgms. of 2-methyl-6-amino-pyrimethyl-ethyl ether are heated with 2 cc. of 60% hydrobromic acid in a bomb tube for about two and one-half hours at 100° C. The contents of the tube are then removed, and concentrated in vacuo.

When the solution reaches small volume, crystals will separate. One cc. of cold water is added and sodium bicarbonate is added to the clear solution. When the solution is neutral, a precipitate is formed. This precipitate is extracted with chloroform, the chloroform solution dried over anhydrous sodium sulphate and the chloroform finally removed in vacuo. The yield consists of about 20 mgms. of crystals which give a strongly positive test for bromine. At this stage, the crystals, consisting largely of 2-methyl-6-amino-pyrimethyl-bromide, are more or less contaminated with 2-methyl-6-oxy-pyrimethyl-bromide which may be removed as desired by extraction of the chloroform solution with dilute alkali.

About 20 mgms. of 2-methyl-6-amino-pyrimethyl-bromide are dissolved in 2 cc. of absolute alcohol and alcoholic hydrobromic acid is added whereupon a precipitate is formed. The alcohol and excess hydrobromic acid are removed in vacuo, leaving an acid ester which is a 2-methyl-6-amino-pyrimethyl-bromide hydrobromide.

*Example II*

In this example, the procedure outlined in Steps 1 to 5, inclusive, of Example I are followed to produce 2-methyl-6-amino-pyrimethyl-ether. This is then converted into a bromide hydrobromide as follows:

150 gms. of 2-methyl-6-amino-pyrimethyl-ethyl ether are heated with 7.75 liters of a 10% solution of hydrobromic acid in glacial acetic acid for two hours at 100° C. (This is a ratio of slightly more than 3 mole hydrobromic acid to one mole of the ether.) At the end of this time, the liquid remaining is decanted from the crystals which separate out. The crystals are washed several times with anhydrous ether and then may be purified by dissolving in a small amount of methanol and reprecipitating by the addition of the ether. The pure compound thus obtained melts at 192–193° C. and is a hydrobromide of 2-methyl-6-amino-pyrimethyl-bromide. The pure compound is not as stable as the crude product containing small amounts of free hydrobromic and glacial acetic acid, which appear to act as stabilizing agents.

Anal. calc. for $C_6H_9N_3Br_2$: C, 25.45; H, 3.21; N, 14.85; found, C, 26.56, 26.55, 26.48; H, 3.50, 3.62, 3.34; N, 14.71, 14.99.

The bromide hydrobromide produced in accordance with the preceding step may be coupled with an appropriate thiazole to produce an antineuritic substance in accordance with the methods described in the aforementioned application Serial No. 134,334.

By methods analogous to the foregoing ones, the other corresponding pyrimethyl halide ester may be prepared. Such esters may also be produced by reacting the aforementioned bromide ester with a silver salt of one of the other halogen acids, e. g. silver chloride. While the invention contemplates the production and use of the iodide ester, the bromide and chloride esters are preferred because they are much more active.

Although in all of the examples recited hereinabove, the pyrimethyl group has a methyl group located in the 2-position, the invention is not limited to these particular derivatives. For example, the methyl group in the 2 position of the pyrimethyl radical may be replaced by the homologues thereof, such as the ethyl and propyl groups. Also instead of the methylene group in position 5, other alkylene groups, such as the ethylene group, may be substituted. Where alkyl groups are described as substituents in the various compounds mentioned herein, aralkyl groups may in general be used with satisfactory results. Hence, when the term "alkyl" is used herein and in the annexed claims, it is also intended to embrace the aralkyl groups.

What is claimed is:

1. Pyrimidine compounds of the general formula

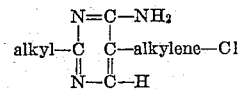

2. Pyrimidine compounds of the general formula

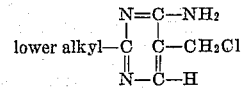

3. The pyrimidine compound having the formula

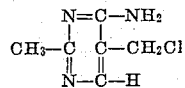

ROBERT R. WILLIAMS.
JOSEPH K. CLINE.